US009092308B2

(12) United States Patent
Suzuki et al.

(10) Patent No.: US 9,092,308 B2
(45) Date of Patent: Jul. 28, 2015

(54) OUTPUT CONTROL APPARATUS FOR ONBOARD IMAGE DISPLAY

(71) Applicant: HONDA MOTOR CO., LTD, Minato-ku, Tokyo (JP)

(72) Inventors: Atsuyuki Suzuki, Wako (JP); Shinichiro Goto, Wako (JP); Junichi Hirose, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 13/693,248

(22) Filed: Dec. 4, 2012

(65) Prior Publication Data
US 2013/0144487 A1 Jun. 6, 2013

(30) Foreign Application Priority Data
Dec. 6, 2011 (JP) ................................. 2011-266564

(51) Int. Cl.
*B60K 37/06* (2006.01)
*G01C 21/26* (2006.01)
*G06F 17/00* (2006.01)
*G01C 21/36* (2006.01)

(52) U.S. Cl.
CPC ............ *G06F 17/00* (2013.01); *G01C 21/3661* (2013.01); *G01C 21/3688* (2013.01)

(58) Field of Classification Search
CPC ........................ B60W 2050/146; G01R 27/28
USPC ....................... 701/36, 53, 33, 201; 455/569.2
See application file for complete search history.

(56) References Cited

U.S. PATENT DOCUMENTS

2010/0181172 A1 7/2010 Monig et al.
2011/0086678 A1* 4/2011 Suzuki ........................ 455/569.2
(Continued)

FOREIGN PATENT DOCUMENTS

CN 101689854 A 3/2010
IE EP 2 492 699 A1 * 2/2011
(Continued)

OTHER PUBLICATIONS

Japanese Office Action (Allowance) dated Oct. 8, 2013, issued in corresponding Japanese Patent Application No. 2011-266564.
(Continued)

*Primary Examiner* — Helal A Algahaim
*Assistant Examiner* — Michael Fouche
(74) *Attorney, Agent, or Firm* — Westerman, Hattori, Daniels & Adrian, LLP (57) ABSTRACT

An output control apparatus for an onboard image display apparatus controls output of a signal to be supplied to the image display apparatus mounted in a vehicle, is connectable to a mobile information terminal, and receives image information transmitted from the mobile information terminal to output the received image information. The output control apparatus includes at least two connection units via which the mobile information terminal is connected to the output control apparatus, and a detection unit configured to detect a single terminal connection state in which a single mobile information terminal is connected to the output control apparatus via both of the two connection units. Information received through the two connection units is output on condition that the detection unit detects the single terminal connection state when the vehicle is in a predetermined non-stop state.

11 Claims, 7 Drawing Sheets

(56) References Cited

U.S. PATENT DOCUMENTS

| | | | |
|---|---|---|---|
| 2011/0106432 A1* | 5/2011 | Kawaguchi et al. | 701/201 |
| 2013/0138265 A1* | 5/2013 | Kim et al. | 701/1 |

FOREIGN PATENT DOCUMENTS

| | | | |
|---|---|---|---|
| JP | 2002-297269 A | 10/2002 | |
| JP | 2008-026111 A | 2/2008 | |
| JP | 2008-205712 A | 9/2008 | |
| JP | 2009-139347 A | 6/2009 | |
| JP | 2009-281991 A | 12/2009 | |
| JP | 2010-502115 A | 1/2010 | |
| JP | 2011-029906 A | 2/2011 | |
| WO | 2008/022301 A2 | 2/2008 | |

OTHER PUBLICATIONS

Office Action dated Sep. 3, 2014, issued in corresponding Chinese Patent Application No. 201210514868.4 (12 pages).

* cited by examiner

OUTPUT CONTROL APPARATUS FOR ONBOARD IMAGE DISPLAY

CROSS REFERENCES TO RELATED APPLICATIONS

The present application claims priority under 35 U.S.C. §119 to Japanese Patent Application No. 2011-266564, filed Dec. 6, 2011, entitled "Output Control Apparatus for Onboard Image Display Apparatus." The contents of this application are incorporated herein by reference in their entirety.

TECHNICAL FIELD

The present disclosure relates to an output control apparatus for an image display apparatus mounted in a vehicle and, more particularly, to an output control apparatus that is capable of being connected to a mobile information terminal and that is capable of outputting image information supplied from the mobile information terminal to the image display apparatus.

BACKGROUND

Japanese Unexamined Patent Application Publication No. 2009-281991 discloses a control apparatus that displays information supplied from a mobile information terminal to a display mounted in a vehicle and controls the display mode of the information in accordance with the travelling state of the vehicle. The control apparatus receives movie information, music information, traffic information, or navigation information from the mobile information terminal. With the control apparatus, the control is performed, for example, so that display of the movie information is disabled during high-speed travelling of the vehicle and all the information is displayed on the full screen when a parking brake is turned on.

The functions of mobile information terminals have been advanced in recent years and the mobile information terminals having a navigation function are put on the market. It is convenient for a user of such a mobile information terminal to use the navigation function of the mobile information terminal also during the travelling of a vehicle to allow navigation information to be displayed in an image display apparatus mounted in the vehicle. In view of such circumstances, onboard apparatuses have been developed, through which signals are supplied from the mobile information terminals to the image display apparatuses with user interface provided with multiple connection terminals capable of receiving image information, audio information, and/or control information.

The following situation can possibly occur in such an onboard apparatus. Specifically, for example, in a case in which a mobile information terminal that supplies the navigation information is connected to one of the multiple connection terminals and a portable video disk playback apparatus or the like is connected to another connection terminal, it is desirable that an image of an image signal supplied from the portable video disk playback apparatus be not displayed during the traveling of the vehicle while it is necessary to display an image of the navigation information supplied from the mobile information terminal.

A state in which multiple mobile information terminals are connected to the apparatus is supposed in the control apparatus disclosed in Japanese Unexamined Patent Application Publication No. 2009-281991. However, as for the types of the information that is supplied, there is only a proposal of addition of type information at the side of the mobile information terminals in advance or analysis of input information at the side of the onboard apparatus to recognize the type of the input information, and thus room for improvement exists.

SUMMARY

It is desirable to provide an output control apparatus that appropriately displays an image of image information supplied from a mobile information terminal and that is capable of preventing other image information from being displayed during travelling of a vehicle.

According to an embodiment, an output control apparatus for an onboard image display apparatus controls output of a signal to be supplied to the image display apparatus mounted in a vehicle, is capable of being connected to a mobile information terminal, and receives image information transmitted from the mobile information terminal to output the received image information. The output control apparatus includes, for example, at least two connection units via which the mobile information terminal is connected to the output control apparatus, and a detection unit configured to detect a single terminal connection state in which a single mobile information terminal is connected to the output control apparatus via both of the two connection units. Information received through the two connection units is output on condition that the detection unit detects the single terminal connection state when the vehicle is in a predetermined non-stop state.

In the output control apparatus, for example, the detection unit preferably includes a connection circuit unit that electrically connects two signal lines that connect the mobile information terminal to the two respective connection units, and the detection unit preferably determines that the output control apparatus is in the single terminal connection state if a test electrical signal is transmitted to one of the two signal lines and the transmitted electrical signal is detected from the other signal line.

In the output control apparatus, the connection circuit unit preferably includes a switching part to which shield lines in the two signals lines or ground lines in the two signal lines are electrically connected and which separates the connected lines from a ground unit of the output control apparatus.

In the output control apparatus, the switching part is preferably capable of being operated by a user and the user is preferably prompted to perform an operation to operate the switching part to separate the connected lines from the ground unit in guidance to start output of the image information. The detection unit preferably transmits the test electrical signal when the switching part (52) is operated.

In the output control apparatus, the detection unit preferably transmits the test electrical signal immediately after a communication electrical signal is detected in each of the two connection units.

In the output control apparatus, the detection unit may periodically transmit the test electrical signal.

In the output control apparatus, the detection unit may determine that the output control apparatus is in the single terminal connection state if two pieces of terminal identification information received through the two connection units coincides with each other.

In the output control apparatus, it is preferred that an audio signal be input into one of the two connection units and an image signal be input into the other connection unit.

The output control apparatus preferably further includes an input unit configured to receive an operation of a user. Which connection unit the mobile information terminal is connected via is preferably recognized from operation information input with the input unit prior to output of the image information and the detection unit is preferably operated on the basis of the result of the recognition.

According to the embodiment, the single terminal connection state in which a single mobile information terminal is connected to the output control apparatus via the connection units is detected, and the information received through the connection units is enabled to output to the image display apparatus on condition that the single terminal connection state is detected when the vehicle is in the predetermined non-stop state. When the single terminal connection state is detected, the probability that another electronic device is connected to one of the connection units is eliminated, and thus the image information received from the mobile information terminal is appropriately displayed and other image information is prevented from being displayed in the predetermined non-stop state.

It is also determined that the output control apparatus is in the single terminal connection state if the test electrical signal is transmitted to one of the two signal lines and the transmitted electrical signal is detected from the other signal line by using the connection circuit unit that electrically connects the two signal lines that connect the mobile information terminal to the two respective connection units. Accordingly, it is possible to accurately determine the single terminal connection state with the relatively simple configuration.

It is configured that the shield lines in the two signals lines or the ground lines in the two signal lines are electrically connected. The switching part is provided to separate the connected lines from the ground unit of the output control apparatus. Since the shield lines or the ground lines in the two signal lines are connected to the common ground unit (grounded) at the side of the mobile information terminal, the two shield lines or ground lines are electrically connected to compose the closed circuit (in the case of the single terminal connection state). In addition, since the switching part is operated to separate one end of the closed circuit from the ground unit of the output control apparatus, it is determined that the output control apparatus is in the single terminal connection state. Accordingly, it is possible to easily determine the single terminal connection state with the existing signal lines.

The user is prompted to perform the operation to operate the switching part to separate the connected lines from the ground unit in guidance to start output of the image information received from the mobile information terminal. The test electrical signal is transmitted when the switching part is operated. Accordingly, it is possible to operate the switching part in response to a natural operation by the user to determine the single terminal connection state at appropriate timing.

Since the test electrical signal is transmitted immediately after the communication electrical signal is detected in each of the two connection units, it is possible to reduce an adverse effect of the test electrical signal on the communication electrical signals as a noise.

Since the test electrical signal is periodically transmitted, it is possible to reduce an adverse effect of the test electrical signal on the communication electrical signals as a noise.

Since it is determined that the output control apparatus is in the single terminal connection state if two pieces of terminal identification information received through the two connection units coincides with each other, it is possible to determine the single terminal connection state by software processing without using the hardware circuit.

Since an audio signal is input into one of the two connection units and an image signal is input into the other connection unit, it is possible to select the audio and image connection modes according to the user's personal preference.

Prior to output of the received image information, it is recognized that via which connection unit the mobile information terminal is connected from operation information input with the input unit and the single terminal connection state is determined on the basis of the result of the recognition. Accordingly, it is possible to select the audio and image connection modes according to the user's personal preference. In addition, the determination can be performed on the basis of the result of the recognition of a connection unit selected by the user to find a connection mistake or a contact failure of the connection unit.

BRIEF DESCRIPTION OF THE DRAWINGS

The advantages of the disclosure will become apparent in the following description taken in conjunction with the following drawings.

DETAILED DESCRIPTION

Figure 1:
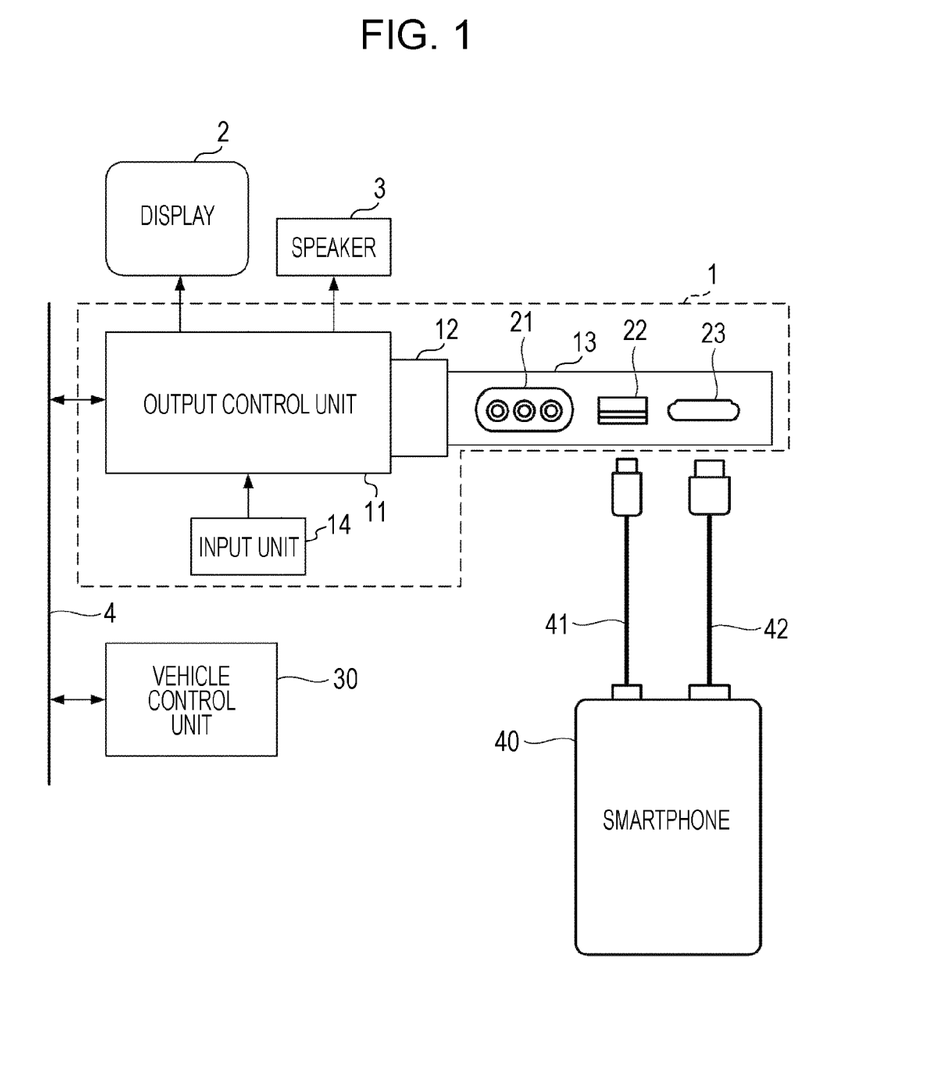
FIG. 1 illustrates an example of the configuration of an output control apparatus for an onboard image display apparatus, according to a first embodiment, and peripheral devices.

Embodiments will herein be described with reference to the attached drawings.
First Embodiment FIG. 1 illustrates an example of the configuration of an output control apparatus for an image display apparatus mounted in a vehicle, according to a first embodiment, and peripheral devices. Referring to FIG. 1, an output control apparatus 1 includes an output control unit 11, a connection state determining unit 12, an interface unit 13, and an input unit 14.

The output control unit 11 is connected to an onboard image display apparatus (hereinafter referred to as a "display") 2 and a speaker 3. The output control unit 11 controls output of information (image information, audio information, and/or control information) received via the interface unit 13 to the display 2 and/or the speaker 3. The output control unit 11 is connected to a vehicle control unit 30 via a bus 4 of an onboard local area network (LAN). The vehicle control unit 30 controls, for example, an engine that drives the vehicle and a transmission. Vehicle information, such as a vehicle speed VP and operation information with a parking brake, which is necessary for the control, is supplied from the vehicle control unit 30 to the output control unit 11. Based on these information, the output control unit 11 detects that the vehicle speed VP is zero and the parking brake is turned on.

The interface unit 13 includes an RCA-type image-audio signal input terminal (hereinafter referred to as an "RCA terminal") 21, a universal serial bus (USB) terminal 22 conforming to the USB standard, and a high definition multimedia interface (HDMI) terminal 23 conforming to the HDMI standard. The input unit 14 includes a touch panel or a keyboard used by a user to perform an operation, if needed, and supplies information that is input by the user to the output control unit 11.

The output control unit 11 is configured so as to be capable of outputting (displaying) navigation information (route guide information) supplied from a smartphone 40 in the display 2 when the smartphone 40 having the navigation function is connected to the output control apparatus 1 via a USB cable 41 and an HDMI cable 42. The USB cable 41 and the HDMI cable 42 are connection cables conforming to the USB standard and the HDMI standard, respectively.

Since it is necessary to display the navigation information also during traveling of the vehicle, the output control apparatus 1 determines whether an electronic device connected to the output control apparatus 1 via the USB terminal 22 and the HDMI terminal 23 is only the smartphone (a state in which only a mobile information terminal such as the smartphone 40 or PDA is connected to the output control apparatus 1 is called a "single terminal connection state") and displays the navigation information supplied from the smartphone 40 in the display 2 even during the traveling of the vehicle in the single terminal connection state.

Figure 2:
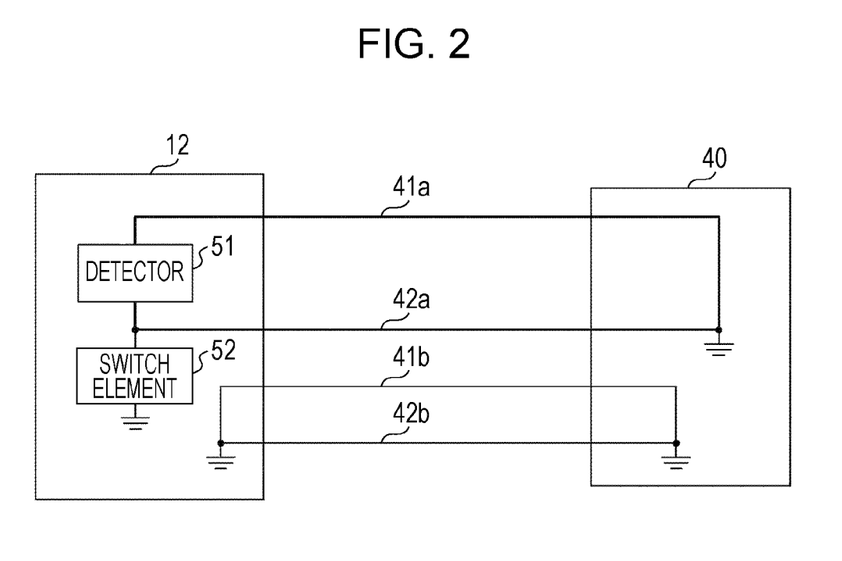
FIG. 2 is a diagram for describing how a single terminal connection state is determined (the first embodiment)

The connection state determining unit 12 includes a detector 51 used to determine the single terminal connection state and a switch element 52 (refer to FIG. 2). The connection state determining unit 12 operates in response to a control signal supplied from the output control unit 11.

FIG. 2 is a diagram for describing how the single terminal connection state is determined. A state in which the smartphone 40 is connected to the interface unit 13 via the USB cable 41 and the HDMI cable 42 is illustrated in FIG. 2. Referring to FIG. 2, a line 41a and a line 41b denote a shield line and a ground line (earth line) included in the USB cable 41, respectively. A line 42a and a line 42b denote a shield line and a ground line (earth line) included in the HDMI cable 42, respectively.

The shield line 41a is connected to the shield line 42a via the detector 51, and the shield line 42a (one end of the detector 51) is grounded via the switch element 52. Since the shield line 41a, the detector 51, and the shield line 42a compose a closed circuit (hereinafter referred to as a "connection closed circuit") in the state in FIG. 2 in which the smartphone 40 is connected to the output control apparatus 1, the switch element 52 is turned off to separate the detector 51 (the shield line 42a) from the ground of the connection state determining unit 12 and conduction check is performed with the detector 51 to determine whether the connection closed circuit is formed. If the connection closed circuit is formed, the current connection state is determined to be the single terminal connection state. In contrast, when a different device is connected to one of the terminals, for example, when a portable video disk playback apparatus is connected to the HDMI terminal 23, the current connection state is determined not to be the single terminal connection state because the shield line 42a is not connected and the connection closed circuit is not formed. That is, the connection closed circuit is not formed at the smartphone's end.

The switch element 52 is, for example, a relay or a metal oxide semiconductor field effect transistor (MOS-FET) in the present embodiment and turning on and off of the switch element 52 is performed by the output control unit 11.

Figure 3:
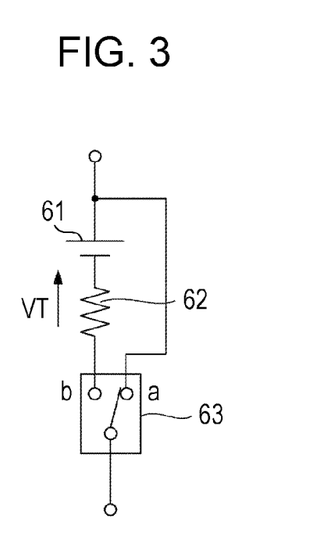
FIG. 3 is an equivalent circuit diagram illustrating an example of the configuration of a detector illustrated in FIG. 2.

FIG. 3 is an equivalent circuit diagram illustrating an example of the configuration of the detector 51. Referring to FIG. 3, the detector 51 includes a voltage source 61, a resistor 62, and a change-over switch 63. The change-over switch 63 is connected to a terminal "a" side when a detection operation, or the conduction check is not to be performed and is connected to a terminal "b" side when the conduction check is to be performed. A switching operation of the change-over switch 63 is performed in response to a switching signal supplied from the output control unit 11 and a voltage VT between both ends of the resistor 62 is supplied to the output control unit 11. A combination of the voltage source 61 and the resistor 62 may be composed of, for example, a transistor and a resistor.

An output voltage VD from the voltage source 61 and a resistance value RD of the resistor 62 are set so that weak current flows through the connection closed circuit. If the voltage VT is substantially equal to the voltage VD when the change-over switch 63 is connected to the terminal b side, it is determined that the connection closed circuit is formed.

In the present embodiment, transmission of the control information and charging of the smartphone 40 are performed via the USB cable 41 and transmission of the image information and the audio information (the route guide information based on the navigation function) from the smartphone 40 to the output control apparatus 1 is performed via the HDMI cable 42. The output control apparatus 1 is configured so that it can be detected whether a signal is input into the output control apparatus 1 via the signal cable corresponding to each terminal in the interface unit 13 with the output control unit 11.

Figure 4:
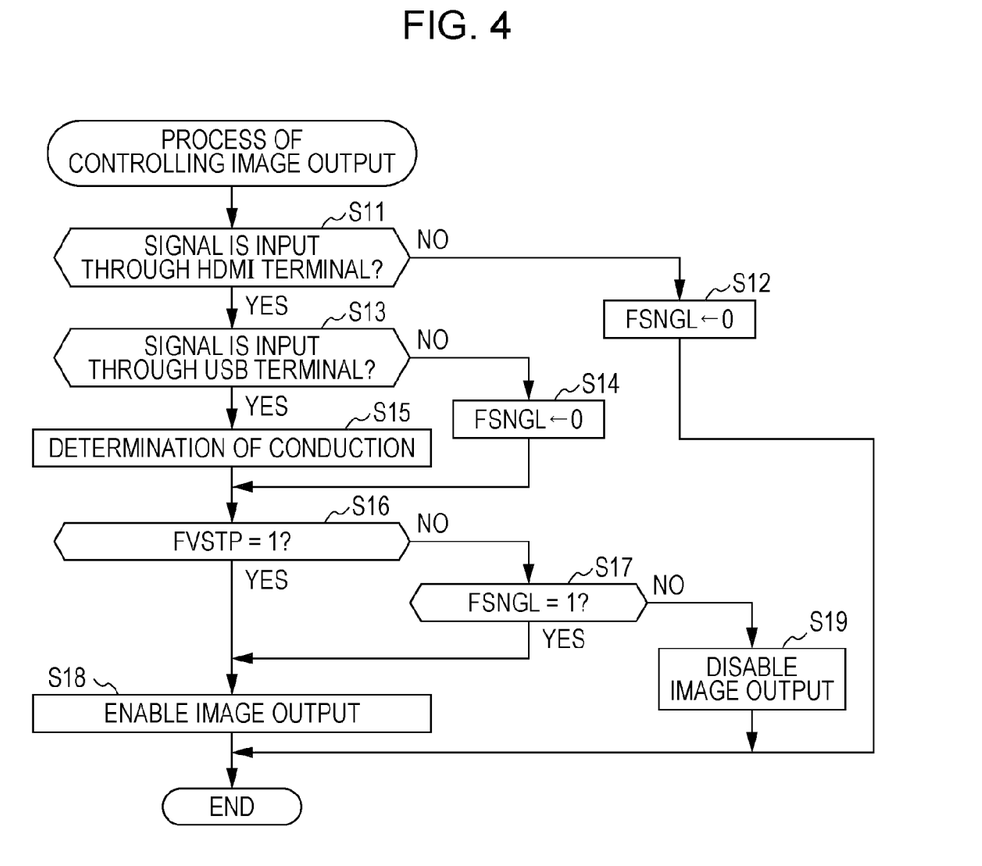
FIG. 4 is a flow chart illustrating an example of a process of controlling image output performed by an output control unit in FIG. 1.

FIG. 4 is a flow chart illustrating an example of a process of controlling image output performed by the output control unit 11. The process is performed every predetermined time (for example, every 100 milliseconds). The output control unit 11 performs or provides various functions such as those described in the present application by means of a CPU which executes a program. In the present application, the term program generally refers to a set of coded instructions that enable a computer to perform a specified function. Programs may be generally stored on a storage device such as memory. Further, programs may be implemented internally or externally to a system, while remaining accessible by that system.

Referring to FIG. 4, in Step S11, the output control unit 11 determines whether a signal is input through the HDMI terminal 23. If a signal is not input through the HDMI terminal 23 (No in Step S11), in Step S12, the output control unit 11 sets a single terminal connection state flag FSNGL to "0." Then, the process is terminated. The single terminal connection state flag FSNGL is set to "1" if it is determined that the output control apparatus 1 is in the single terminal connection state, for example, in conduction determination in Step S15.

If the output control unit 11 determines that a signal is input through the HDMI terminal 23 (YES in Step S11), in Step S13, the output control unit 11 determines whether a signal is input through the USB terminal 22. If a signal is input through the USB terminal 22 (YES in Step S13), that is, if signals are input through both the USB terminal 22 and the HDMI terminal 23, in Step S15, the output control unit 11 performs the conduction determination with the detector 51 described above. If it is determined that the output control apparatus 1 is in the single terminal connection state, the single terminal connection state flag FSNGL is set to "1."

In Step S16, the output control unit 11 determines whether a vehicle stop flag FVSTP is set to "1." The vehicle stop flag FVSTP is set to "1" if the vehicle speed VP is equal to "0" in another processing (not illustrated). If the output control unit 11 determines that the vehicle stop flag FVSTP is set to "1" (YES in Step S16), in Step S18, the output control unit 11 enables output of the image signal input through the HDMI terminal 23 to the display 2.

If the output control unit 11 determines that the vehicle stop flag FVSTP is not set to "1" (NO in Step S16) and the vehicle is traveling, in Step S17, the output control unit 11 determines whether the single terminal connection state flag FSNGL is set to "1." If the output control unit 11 determines that the single terminal connection state flag FSNGL is set to "1" (YES in Step S17), in Step S18, the output control unit 11 enables output of the image signal. If the output control unit 11 determines that the single terminal connection state flag FSNGL is not set to "1" (NO in Step S17), in Step S19, the output control unit 11 disables output of the image signal input through the HDMI terminal 23 in the display 2.

If a signal is not input through the USB terminal (NO in Step S13), that is, if a signal is input through the HDMI terminal 23 but no signal is input through the USB terminal 22, in Step S14, the output control unit 11 sets the single terminal connection state flag FSNGL to "0." Then, the process goes to Step S16.

As described above, according to the present embodiment, the single terminal connection state in which the smartphone 40 is connected to the output control apparatus 1 via both the USB terminal 22 and the HDMI terminal 23 is detected, and the navigation information input through the HDMI terminal 23 is output to the display 2 on condition that the single terminal connection state is detected during the traveling of the vehicle. Since the probability that another electronic device is connected to the HDMI terminal 23 is eliminated when the single terminal connection state is detected, an image of the navigation information supplied from the smartphone 40 is appropriately displayed and other image information is prevented from being displayed during the traveling of the vehicle.

In addition, the connection state determining unit 12 that electrically connects the shield line 41a of the USB cable 41 to the shield line 42a of the HDMI cable 42 is used to perform the conduction determination between the shield line 41a and the shield line 42a, and the output control apparatus 1 is determined to be in the single terminal connection state when the conduction between the shield line 41a and the shield line 42a is confirmed. Accordingly, it is possible to accurately determine the single terminal connection state with the relatively simple configuration.

Since the switch element 52 is operated to separate one end of the circuit composed of the shield line 41a, the shield line 42a, and the detector 51 from the ground, it is possible to easily determine the single terminal connection state with the existing shield lines 41a and 42a.

Since the conduction determination is performed immediately after signals input through both the USB terminal 22 and the HDMI terminal 23 are detected, it is possible to reduce an adverse effect of a signal for the conduction determination (temporary application of direct current voltage) on the input signals as a noise.

When the connection through either of the USB terminal 22 and the HDMI terminal 23 is disconnected from the state in which both the USB terminal 22 and the HDMI terminal 23 are connected to the smartphone 40, the single terminal connection state flag FSNGL is returned to "0" in Step S12 or Step S14 in FIG. 4 to disable output of the navigation information during the traveling of the vehicle.

In the present embodiment, the smartphone 40 corresponds to a mobile information terminal, the switch element 52 corresponds to a switching part, the USB terminal 22 and the HDMI terminal 23 correspond to connection units, the connection state determining unit 12 and the output control unit 11 compose a detection unit, and the connection state determining unit 12 corresponds to a connection circuit unit. These correspondences are presented as mere examples and should not be interpreted to limit the scope of the accompanying claims.

First Modification

Steps S11 to S14 in the process in FIG. 4 may be omitted and the conduction determination may be simply periodically performed (for example, every 100 milliseconds) to perform the control in accordance with the result of the determination.

Since it takes a short time to perform the conduction determination also in this first modification, it is possible to reduce an adverse effect of the signal for the conduction determination (temporary application of direct current voltage) on the input signals as a noise.

Second Modification

The switch element 52 may be composed of an automatic reset switch (a switch that is automatically reset to an off state when the user finishes an on operation) 52a which the user can turn on and the user may be prompted to perform the "on" operation of the switch 52a in guidance (image display or audio) to start output of the navigation information to perform the conduction determination when the switch 52a is turned on.

Also in this second modification, when the connection through either of the USB terminal 22 and the HDMI terminal 23 is disconnected from the state in which both the USB terminal 22 and the HDMI terminal 23 are connected to the smartphone 40, it is desirable to disable output of the navigation information during the traveling of the vehicle.

According to the second modification, it is possible to operate the switch 52a in response to a natural operation by the user to determine the single terminal connection state at appropriate timing.

Third Modification

Figure 5:
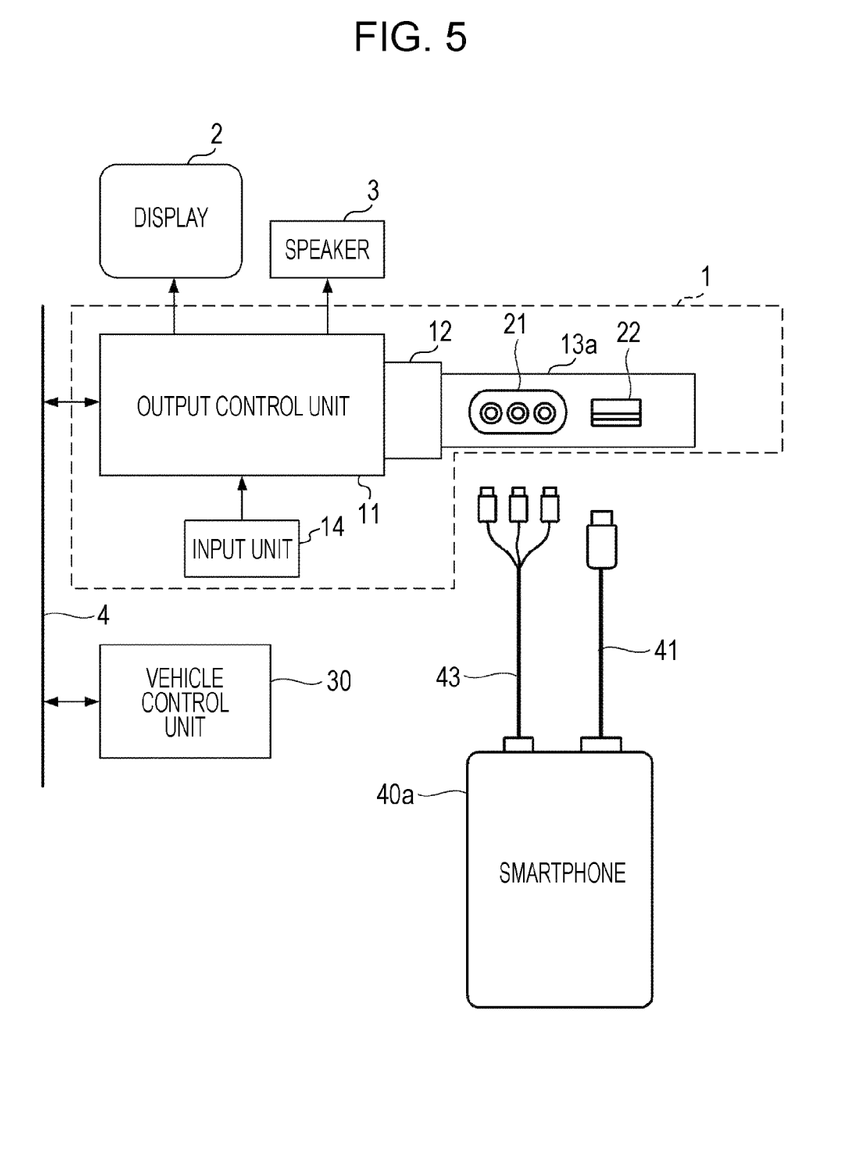
FIG. 5 illustrates an exemplary modification of the configuration illustrated in FIG. 1.

FIG. 5 illustrates an example of the configuration of an output control apparatus according to a third modification and peripheral devices. The configuration of the third modification does not include an interface conforming to the HDMI standard and supports a smartphone 40a that outputs an image signal through an RCA cable.

In the third modification, the output control apparatus 1 includes an interface unit 13a that includes only the RCA terminal 21 and the USB terminal 22. The interface unit 13a is connected to the smartphone 40a via an RCA cable 43. Although the RCA cable 43 is normally composed of one image signal line and two audio signal lines, only the image signal cable is used and audio signals are transmitted through the USB cable in the third modification. In other words, transmission of the control information and the audio information and charging of the smartphone 40a are performed via the USB cable 41 in the third modification.

Since the RCA cable 43 includes the shield line, the method of determining the single terminal connection state described above is applicable to the third modification.

Second Embodiment

Figure 6:
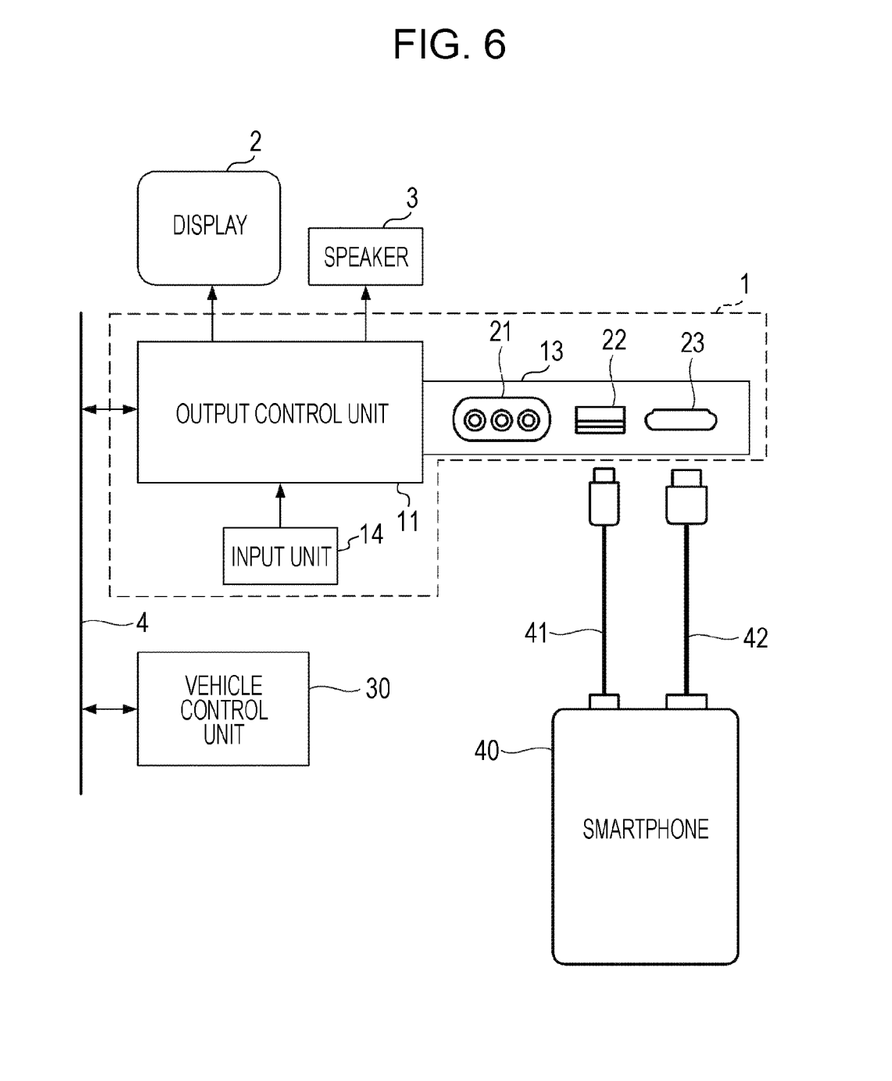
FIG. 6 illustrates an example of the configuration of an output control apparatus for an onboard image display apparatus, according to a second embodiment, and peripheral devices.

FIG. 6 illustrates an example of the configuration of an output control apparatus according to a second embodiment and peripheral devices. In the second embodiment, the single terminal connection state is determined without the connection state determining unit 12 of the first embodiment. The second embodiment is the same as the first embodiment except for the following points.

Figure 7:
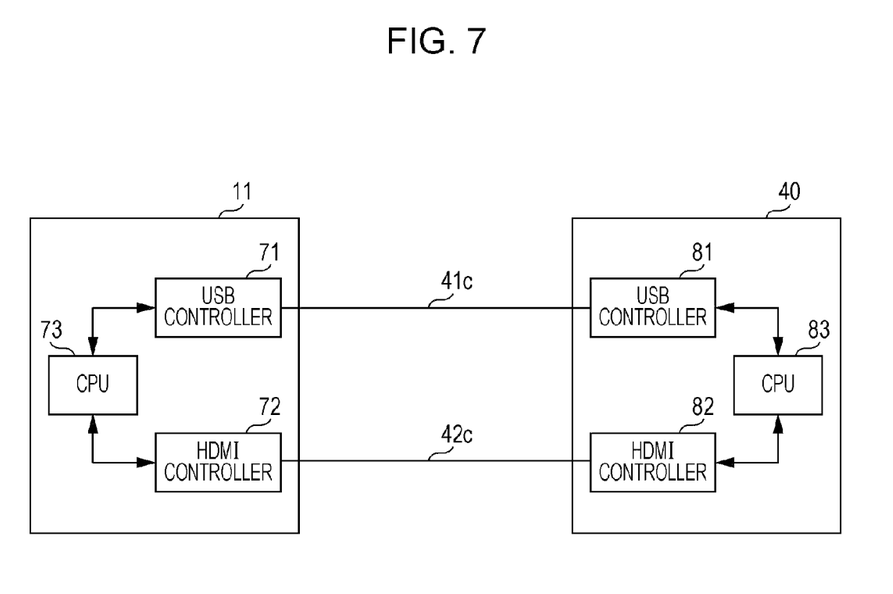
FIG. 7 is a diagram for describing how the single terminal connection state is determined (the second embodiment)

FIG. 7 is a diagram for describing how the single terminal connection state is determined in the second embodiment. Referring to FIG. 7, the output control unit 11 having interfaces conforming to the USB standard and the HDMI standard includes a USB controller 71 for performing information transmission conforming to the USB standard and an HDMI controller 72 for performing information transmission conforming to the HDMI standard. Similarly, the smartphone 40 includes a USB controller 81 for performing the information transmission conforming to the USB standard and an HDMI controller 82 for performing the information transmission conforming to the HDMI standard.

The output control unit 11 includes a central processing unit (CPU) 73 that controls the entire output control unit 11. The CPU 73 performs control processing based on information supplied from the USB controller 71 and the HDMI controller 72. Similarly, the smartphone 40 includes a CPU 83 that controls the entire smartphone 40. The CPU 83 performs control processing based on information supplied from the USB controller 81 and the HDMI controller 82. The above configuration is essential in an electronic device that performs the information transmission conforming to the USB standard and the information transmission conforming to the HDMI standard, although this is not described in the first embodiment. The same applies to the first embodiment.

In the second embodiment, when the smartphone 40 is connected to the interface unit 13 via the USB cable 41 and the HDMI cable 42, the CPU 83 in the smartphone 40 transmits an individual identification number of the smartphone 40 to the output control unit 11 through a control signal line 41c of the USB cable 41 and a control signal line 42c of the HDMI cable 42.

If the two individual identification numbers received through the control signal line 41c and the control signal line 42c coincide with each other, the CPU 73 in the output control unit 11 determines that the output control apparatus 1 is in the single terminal connection state and enables output of the navigation information supplied from the smartphone 40 in the display 2 during the traveling of the vehicle.

This determination process may be performed only once immediately after the USB cable 41 and the HDMI cable 42 are connected or may be periodically performed every predetermined time. When the HDMI cable 42 is disconnected in the case in which the determination process is performed once immediately after the connection, the CPU 73 in the output control unit 11 disables output of the navigation information supplied from the smartphone 40 to the display 2 during the traveling of the vehicle.

According to the present embodiment, it is possible to determine the single terminal connection state by software processing without using the connection state determining unit 12 including the detector 51 and the switch element 52 in the first embodiment.

In the second embodiment, the USB controller 71, the HDMI controller 72, and the CPU 73 in the output control unit 11 compose the detection unit, for example.

While some specific examples and embodiments are described above, it will be clear that the present disclosure is not limited to these specific examples and embodiments and that many changes and modified embodiments will be obvious to those skilled in the art. For example, although the smartphone is used as the mobile information terminal in the above embodiments, the mobile information terminal is not limited to the smartphone. The present disclosure is applicable to a case in which a mobile information terminal that has the navigation function and that is capable of outputting the navigation information via two cables is used. In the above explanations, the connection between the smartphone 40 and the output control apparatus 1 is implemented by wired connection. However, wireless connection may be also used. In such a modification, the interface unit 13 includes a wireless connection interface such as based on Bluetooth to wirelessly connect with the smartphone 40. For example, the smartphone 40 may connect to the USB terminal 22 via the USB cable 41 and also wirelessly connects to the wireless connection interface. In this embodiment, the smartphone 40 transmits the navigation information to the output control apparatus 1 via the wireless connection interface. In this embodiment, when the smartphone 40 is connected to the interface unit 13 via the USB cable 41 and the wireless connection interface, the CPU 83 in the smartphone 40 transmits an identification number of the smartphone 40 to the output control unit 11 through a control signal line 41c of the USB cable 41 and the wireless connection interface. The output control unit 11 determines whether the two identification numbers coincide with each other.

The image information transmitted from the mobile information terminal to the onboard image display apparatus is not limited to the navigation information in the above embodiments. For example, the present disclosure is applicable to cases in which the image information that can be supplied during the traveling of vehicles is transmitted from mobile information terminals to onboard image display apparatuses, such as a case in which a mobile information terminal that executes an application for guiding maintenance information about an automobile (vehicle) or an application for adding an automobile instrument display function (for example, a mileage meter) is connected. In such a case, whether the image information transmitted from the mobile information terminal to the onboard image display apparatus is information (including the maintenance information and automobile instrument display information, in addition to the navigation information) which can be supplied during the traveling of the vehicle, that is, whether the image information transmitted from the mobile information terminal to the onboard image display apparatus is allowed to be supplied during the traveling of the vehicle is confirmed at the side of the onboard output control apparatus by using, for example, an information type code transmitted from the mobile information terminal. The present disclosure is applied if the image information transmitted from the mobile information terminal to the onboard image display apparatus is information that is allowed to be supplied during the traveling of the vehicle and it is desirable not to allow output of the information in a "predetermined non-stop state" if the image information is not information that is allowed to be supplied during the traveling of the vehicle.

Figure 8:
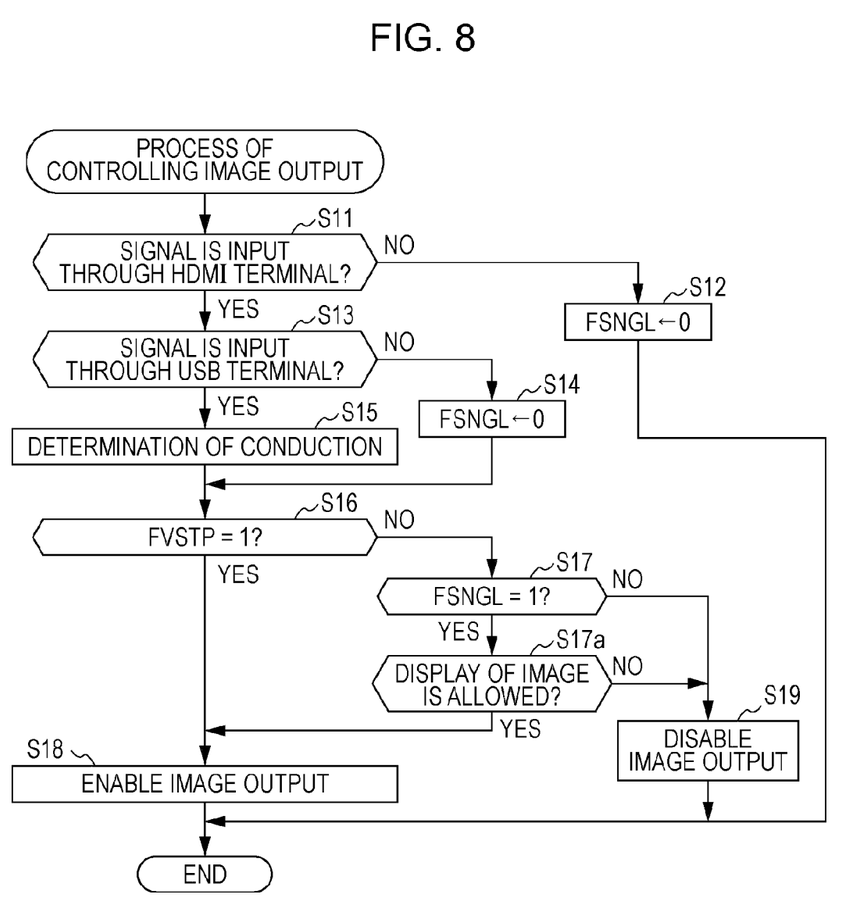
FIG. 8 is a flow chart illustrating an exemplary modification of the process illustrated in FIG. 4.

The above image output control is specifically realized by modifying the process illustrated in FIG. 4 into a process illustrated in FIG. 8. The process in FIG. 8 results from addition of Step S17a to the process in FIG. 4. Referring to FIG. 8, if the output control unit 11 determines that the single terminal connection state flag FSNGL is set to "1" (YES in Step S17), in Step S17a, the output control unit 11 refers to the information type code transmitted from the mobile information terminal to determine whether the display of the image during the traveling of the vehicle is allowed. If the output control apparatus 1 determines that the display of the image during the traveling of the vehicle is allowed (YES in Step S17a), in Step S18, the output control unit 11 enables output of the image. If the output control apparatus 1 determines that the display of the image during the traveling of the vehicle is not allowed (NO in Step S17a), in Step S19, the output control unit 11 disables output of the image.

The process of determining whether the connection closed circuit is formed is not limited to the above one. For example, a method of transmitting a short pulse signal via one shield line and detecting the transmitted pulse signal via the other shield line may be adopted.

It is desirable that the user be prompted to input the connection mode of the smartphone 40 (which connection terminal is used to connect the smartphone 40 to the output control apparatus 1) in guidance (display or audio) before the navigation information is displayed in the display 2, the connection mode be recognized from operation information input by the user with the input unit 14 in response to the guidance, and the single terminal connection state be determined on the basis of the result of the recognition.

Although the smartphone 40 is connected to the output control apparatus 1 via the USB terminal 22 and the HDMI terminal 23 in, for example, the first embodiment, the smartphone 40 may be connected to the output control apparatus 1 via the RCA terminal 21 and the USB terminal 22, as in the third modification, when the user owns the smartphone 40a, because the interface unit 13 in FIG. 1 also includes the RCA terminal 21. In such a modification, it is possible for the user to select the audio and image connection modes with the input unit 14 according to personal preference (convenience). In addition, the determination can be performed on the basis of the result of the recognition of a connection unit selected by the user to find a connection mistake or a contact failure of any connection terminal. In this modification, the connection state determining unit 12 is configured so that the connection closed circuit including the shield line of the RCA cable and the shield line of the USB cable is also formed.

Although the single terminal connection state is detected via the shield line 41a in the USB cable 41 and the shield line 42a in the HDMI cable 42 in the first embodiment described above, the single terminal connection state may be detected via the ground line 41b and the ground line 42b.

Although the example in which the "predetermined non-stop state" means the state in which the vehicle is traveling (the vehicle speed VP is not equal to "0") is described in the above embodiments, the "predetermined non-stop state" is not limited to the above state. For example, states other than a state in which the vehicle speed VP is equal to "0" and the parking brake is operated (turned on) may be considered as the "predetermined non-stop state." In other words, if the parking brake is not operated even when the vehicle speed VP is equal to "0", the vehicle is considered to be in "the predetermined non-stop state."

We claim:

1. An output control apparatus for an onboard image display apparatus, the output control apparatus controlling an output of a signal to be supplied to the image display apparatus mounted in a vehicle, being connectable to a mobile information terminal, and receiving an image information transmitted from the mobile information terminal to output the received image information to the image display apparatus, the output control apparatus comprising:
  at least two connection units via which the mobile information terminal is connected to the output control apparatus; and
  a detection unit configured to detect a single terminal connection state in which only a single mobile information terminal is connected to the output control apparatus by detecting that all of the at least two connection units are connected to the single mobile information terminal,
  wherein the output control apparatus determines whether the vehicle is in a predetermined non-stop state, and
  wherein the output control apparatus enables the output of the image information received through the connection units when the following conditions are satisfied:
  i) the vehicle is in the predetermined non-stop state, and
  ii) the detection unit detects the single terminal connection state.

2. The output control apparatus according to claim 1,
  wherein the mobile information terminal and the at least two connection units are connected with each other via respective signal lines,
  wherein the detection unit includes a connection circuit unit electrically connecting the respective signal lines with each other, and the detection unit transmits a test electrical signal to one of the signal lines, determines whether the transmitted test electrical signal is detected from other one of the signal lines, and if so, detects the single terminal connection state.

3. The output control apparatus according to claim 2,
  wherein the signal lines include respective shield lines or respective ground lines,
  wherein the connection circuit unit electrically connects the respective shield lines with each other or the respective ground lines with each other, and includes a switching part to separate the connected shield lines or the connected ground lines from a ground unit of the output control apparatus.

4. The output control apparatus according to claim 3,
  wherein the switching part is capable of being operated by a user, and
  wherein the detection unit transmits the test electrical signal when the switching part is operated.

5. The output control apparatus according to claim 2,
  wherein the detection unit transmits the test electrical signal immediately after a communication electrical signal is detected in each of the connection units.

6. The output control apparatus according to claim 2,
  wherein the detection unit periodically transmits the test electrical signal.

7. The output control apparatus according to claim 1,
  wherein the detection unit receives a terminal identification information through each of the connection units,
  wherein the detection unit determines that the output control apparatus is in the single terminal connection state if at least two terminal identification informations received through the connection units coincide with each other.

8. The output control apparatus according to claim 1,
  wherein an audio signal is input into one of the connection units and an image signal is input into other one of the connection units.

9. The output control apparatus according to claim 1, further comprising:
  an input unit configured to receive an operation of a user,
  wherein the detection unit receives an information from the input unit, the information indicating which connection unit is to be connected to the mobile information terminal, and
  the detection unit operates on the basis of the information.

10. The output control apparatus according to claim 4,
  wherein the output control apparatus prompts the user to perform an operation to operate the switching part to separate the connected lines from the ground unit in guidance to start output of the image information.

11. The output control apparatus according to claim 1, wherein each of the at least two connection units is a connector terminal.

\* \* \* \* \*